US008672515B2

(12) United States Patent
Anderson et al.

(10) Patent No.: US 8,672,515 B2
(45) Date of Patent: Mar. 18, 2014

(54) MARINE SPOTLIGHT

(75) Inventors: Jason W. Anderson, Shelly Park (NZ); Vitaly Kapelevich, Meadowbank (NZ)

(73) Assignee: Power Products, LLC, Menomonee Falls, WI (US)

( * ) Notice: Subject to any disclaimer, the term of this patent is extended or adjusted under 35 U.S.C. 154(b) by 128 days.

(21) Appl. No.: 13/295,633

(22) Filed: Nov. 14, 2011

(65) Prior Publication Data

US 2012/0120673 A1    May 17, 2012

Related U.S. Application Data

(60) Provisional application No. 61/413,717, filed on Nov. 15, 2010.

(51) Int. Cl.
*F21V 19/02* (2006.01)

(52) U.S. Cl.
USPC ............................. 362/285; 362/287; 362/418

(58) Field of Classification Search
USPC .......................................... 362/285, 287, 418
See application file for complete search history.

(56) References Cited

U.S. PATENT DOCUMENTS

| | | | |
|---|---|---|---|
| 4,203,686 A | 5/1980 | Bowman | |
| 4,935,853 A * | 6/1990 | Collins | 362/272 |
| 5,806,956 A * | 9/1998 | Hyun-Jo | 362/35 |
| 6,112,694 A | 9/2000 | Burgos | |
| 6,786,622 B1 * | 9/2004 | Rice | 362/362 |
| 7,175,314 B2 * | 2/2007 | Laenen et al. | 362/269 |
| 7,402,074 B2 | 7/2008 | LeBlanc et al. | |
| 7,452,091 B2 | 11/2008 | LeBlanc et al. | |
| 8,118,452 B2 * | 2/2012 | Leary et al. | 362/285 |
| 2005/0248930 A1 | 11/2005 | Naval et al. | |
| 2008/0043098 A1 | 2/2008 | Leblanc | |
| 2010/0072328 A1 | 3/2010 | Burnham et al. | |
| 2010/0118539 A1 | 5/2010 | Leary et al. | |
| 2010/0135033 A1 | 6/2010 | Leary et al. | |

OTHER PUBLICATIONS

Allremote Wireless Tech; 970 Serials Lights; Mar. 2, 2009; pp. 1-6.
ACR Electronics, Inc.; The Science of Survival Product Support Manual for RCL-100D/Remote Control Searchlight System; dated 2008; pp. 1-23; Ft. Lauderdale, FL.

* cited by examiner

*Primary Examiner* — Stephen F Husar
*Assistant Examiner* — James Cranson, Jr.
(74) *Attorney, Agent, or Firm* — Quarles & Brady LLP

(57) ABSTRACT

A spotlight for a vehicle includes a base configured to be supported by a surface of the vehicle. A housing is mounted to the base so as to pivot about a first axis relative to the base. A light-emitting device is supported within the housing. The spotlight further includes a reflector configured to reflect light emitted by the light-emitting device. The reflector is mounted within the housing so as to pivot about a second axis relative to the housing. The second axis is generally perpendicular to the first axis. A lens connects to the housing such that light emitted by the light-emitting device and reflected by the reflector passes through the lens.

14 Claims, 17 Drawing Sheets

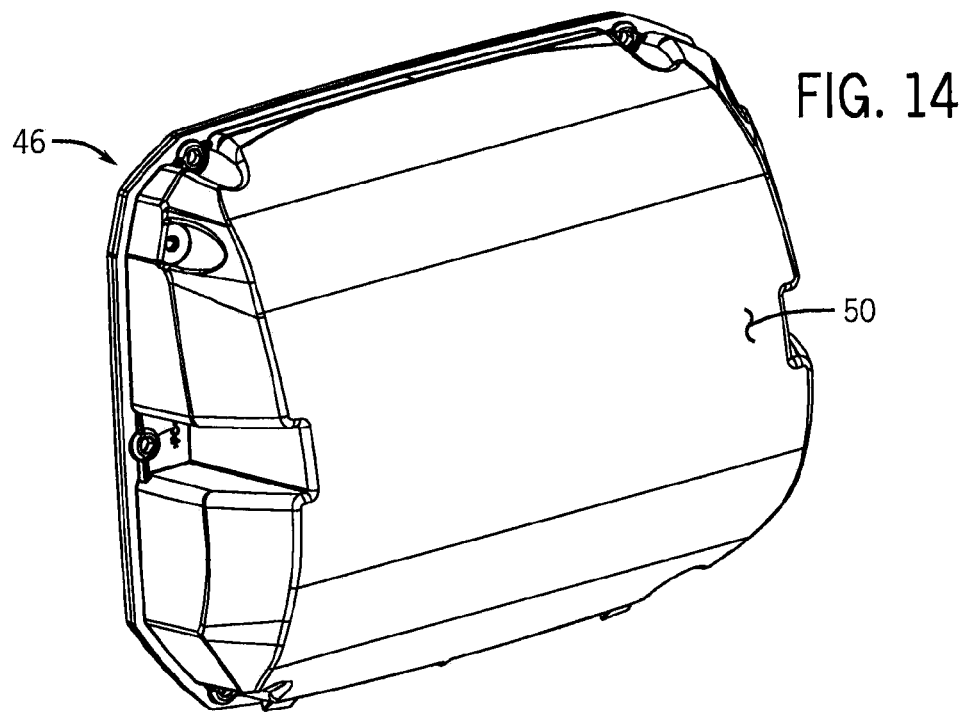
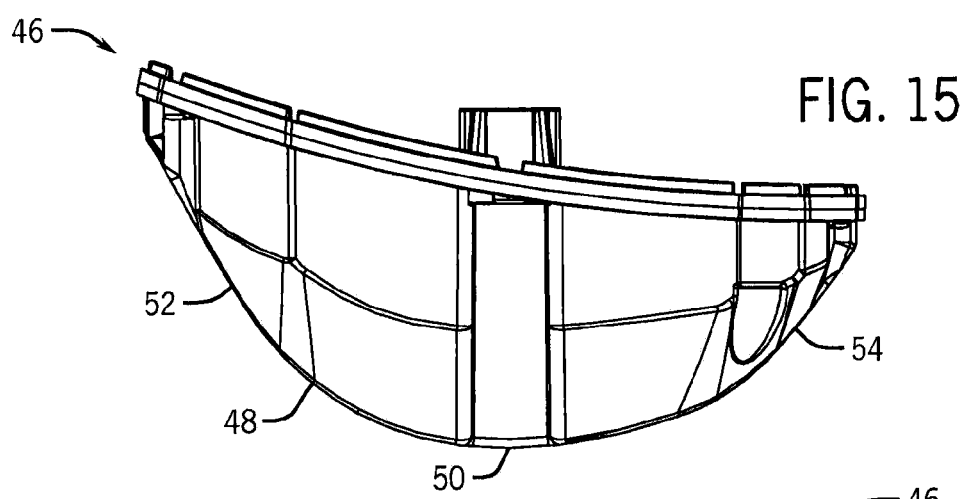
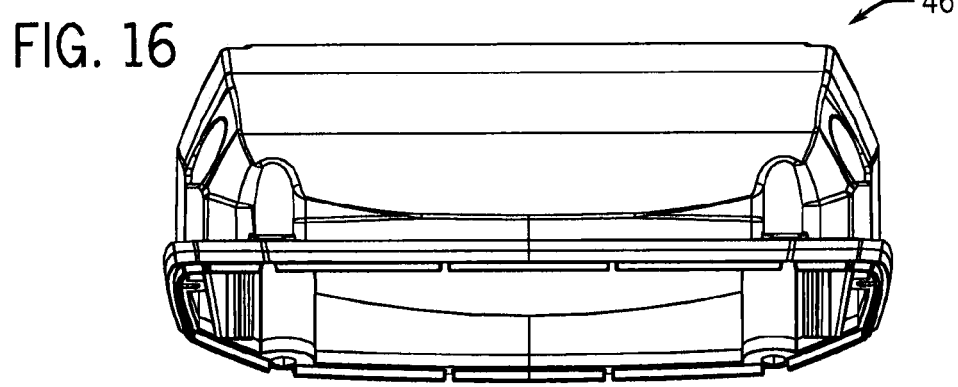

MARINE SPOTLIGHT

CROSS-REFERENCE TO RELATED APPLICATION

This application claims the benefit of U.S. Provisional Patent Application No. 61/413,717 filed Nov. 15, 2010, the disclosure of which is hereby incorporated by reference in its entirety.

STATEMENT CONCERNING FEDERALLY SPONSORED RESEARCH OR DEVELOPMENT

Not applicable.

FIELD OF THE INVENTION

This invention relates to spotlights, in particular marine vehicle spotlights that are capable of pivoting in multiple directions to illuminate an object of interest.

BACKGROUND OF THE INVENTION

Some types of vehicles, such as marine vessels including yachts, tug boats, commercial fishing boats, and the like, include one or more externally mounted spotlights for illuminating nearby objects. In some cases, these spotlights may be remotely controlled to pivot vertically and/or horizontally to thereby illuminate a particular object of interest.

Previous spotlights are limited by one or more drawbacks. For example, in order to facilitate the motion described above, previous marine spotlights typically include multiple external housing sections that pivot relative to one another. Gaps between the housing sections, although small, provide leak paths through which water and/or moisture can enter the spotlight. This water ingress can damage electrical components within the spotlight, thereby reducing its operating life, or fog the lens or reflector.

As another example, pivoting spotlights typically include a drive motor for each direction of motion. The drive motors may be selectively operated (e.g., by pressing a button on a remote control) to pivot the spotlight over a range of motion limited by the spotlight housing. However, at the ends of the range of motion, the motors may nevertheless be energized in an attempt to move the spotlight beyond its range of motion. Such an action can cause the motors to stall and reduce their operating life.

As yet another example, some remote controls for previous spotlights are wireless devices. These wireless remote controls are typically powered by their own internal battery that is received in the remote control and covered by a battery door. It can be difficult to remove the battery door when attempting to access the battery. A user must often attempt to pry between the battery door and the remote control housing, even after the latch of the door is released, using their fingers or another thin object, such as a paper clip, key or the like. Such a task can easily frustrate a user.

As such, what is needed is an improved marine spotlight that addresses one or more of the above drawbacks.

SUMMARY OF THE INVENTION

In one aspect, the present invention provides a spotlight for a vehicle comprising a base configured to be supported by a surface of the vehicle. A housing is mounted to the base so as to pivot about a first axis relative to the base. A light-emitting device is supported within the housing. The spotlight further includes a reflector configured to reflect light emitted by the light-emitting device. The reflector is mounted within the housing so as to pivot about a second axis relative to the housing. The second axis is generally perpendicular to the first axis. A lens connects to the housing such that light emitted by the light-emitting device and reflected by the reflector passes through the lens. The lens includes a central portion that has a generally cylindrical shape that extends longitudinally in a direction generally parallel to the second axis.

In yet another aspect, the present invention provides a battery-operated device comprising a housing that defines a battery compartment configured to house a battery. The housing includes at least a first locking projection and at least a first detachment projection both extending into the battery compartment. A battery door is configured to connect to the housing and inhibit access to the battery compartment. The battery door has at least a first ear including a lobe configured to engage the first locking projection to fix the battery door relative to the housing when the battery door is moved in a first direction relative to the housing. The first ear further includes an angled surface configured to engage the first detachment projection to separate the battery door from the housing when the battery door is moved in a second direction opposite the first direction relative to the housing.

The foregoing and other objects and advantages of the invention will appear from the detailed description which follows. In the description, reference is made to the accompanying drawings which illustrate a preferred embodiment of the invention.

BRIEF DESCRIPTION OF THE DRAWINGS

The invention will hereafter be described with reference to the accompanying drawings, wherein like reference numerals denote like elements, and:

FIG. 14 is a perspective view of a front lens of the light of FIG. 1;

FIG. 15 is a side view of the lens of FIG. 13;

FIG. 16 is a top view of the lens of FIG. 13;

DETAILED DESCRIPTION OF THE PREFERRED EMBODIMENT

Figure 1:
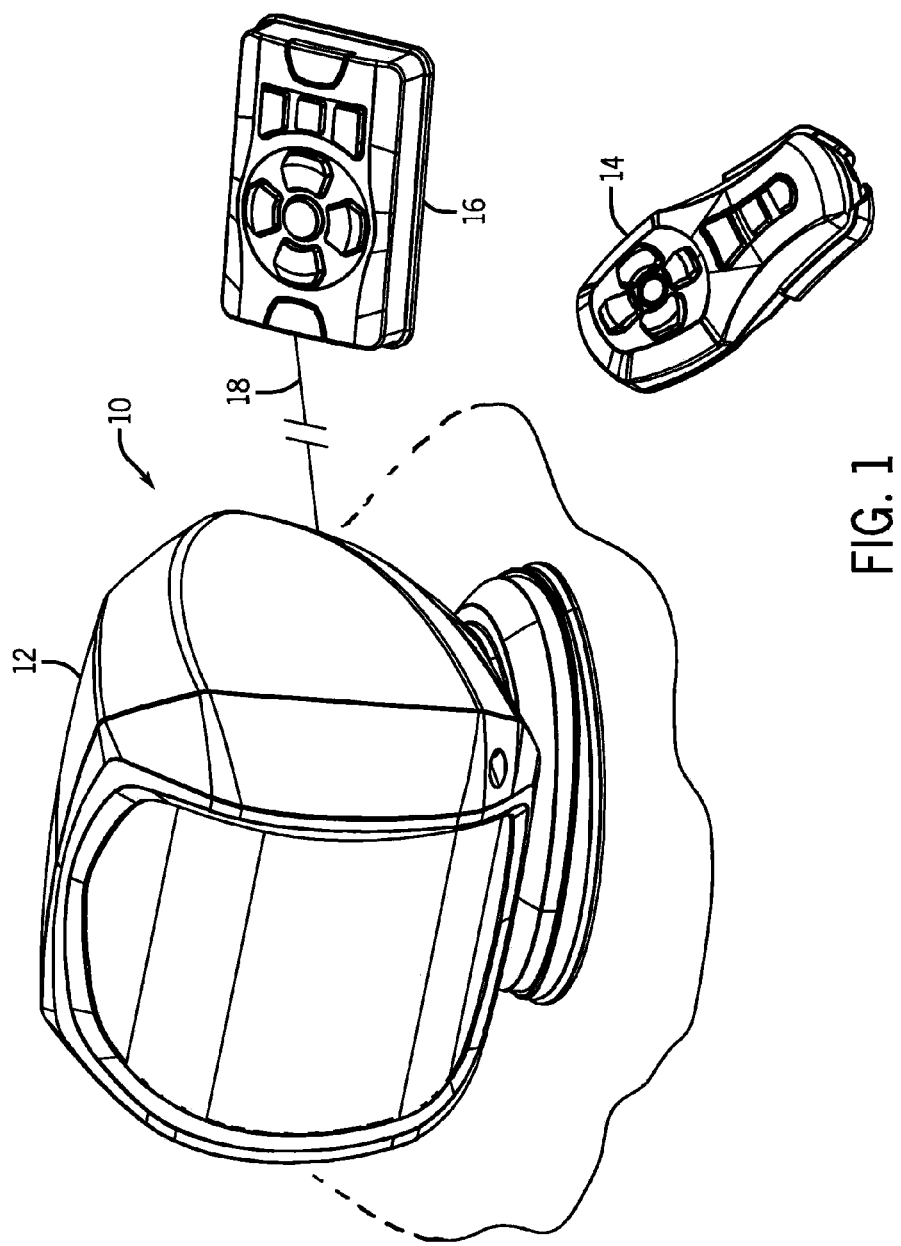
FIG. 1 is a perspective view of a light, a wireless remote control, and a bridge remote control of a spotlight according to the present invention.
Figure 2:
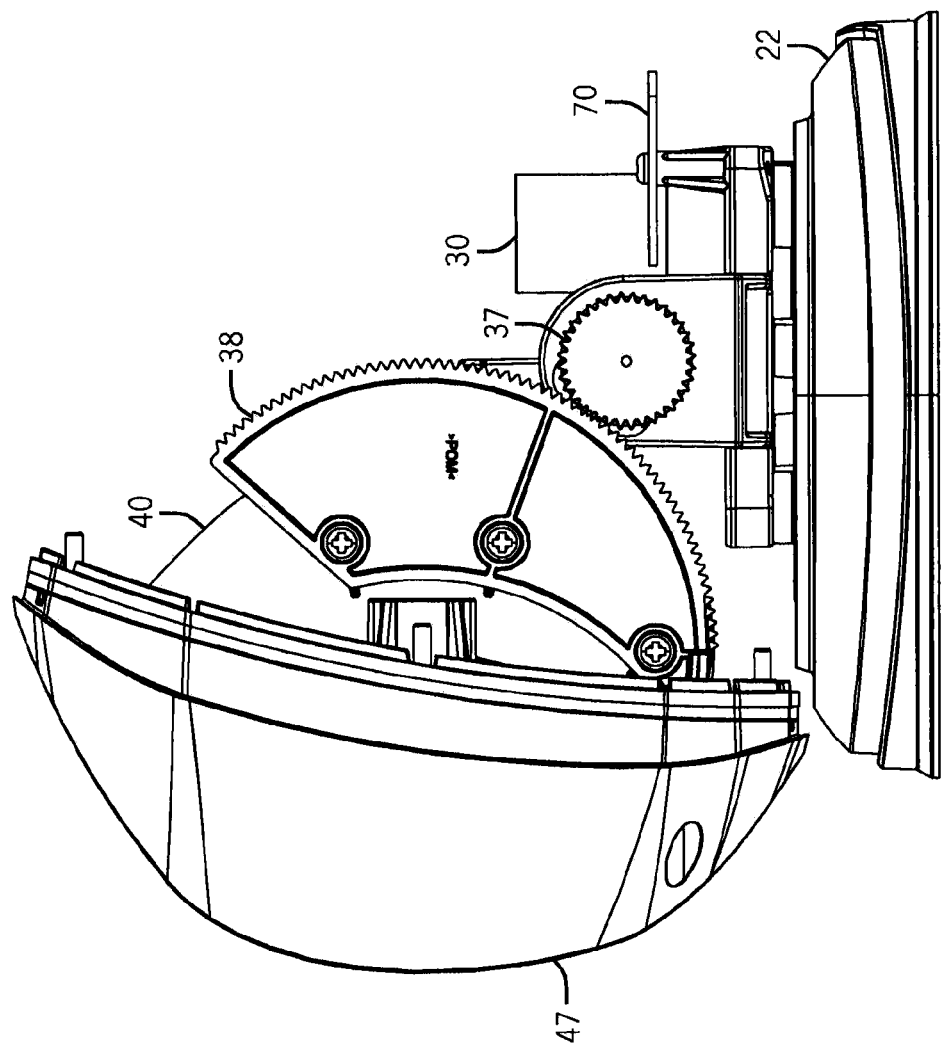
FIG. 2 is a side view of the light of FIG. 1 with a housing removed.
Figure 3:
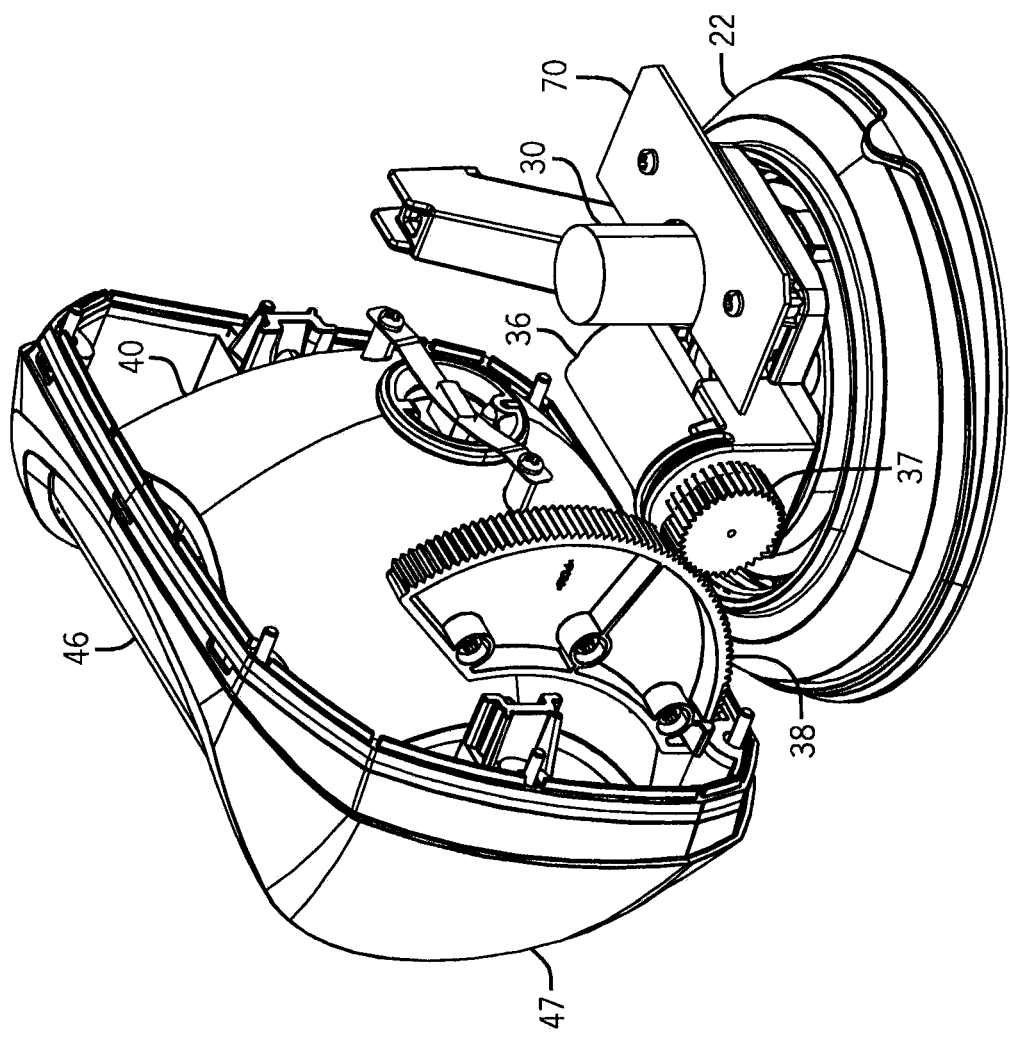
FIG. 3 is a perspective view of the light of FIG. 1 with the housing removed.
Figure 4:
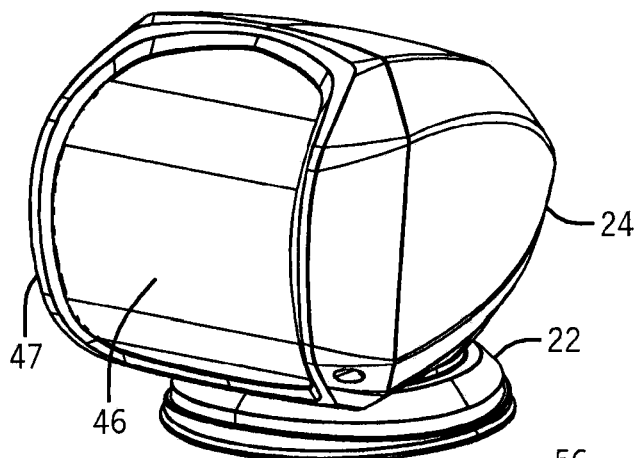
FIG. 4 is a perspective view of the light of FIG. 1.
Figure 5:
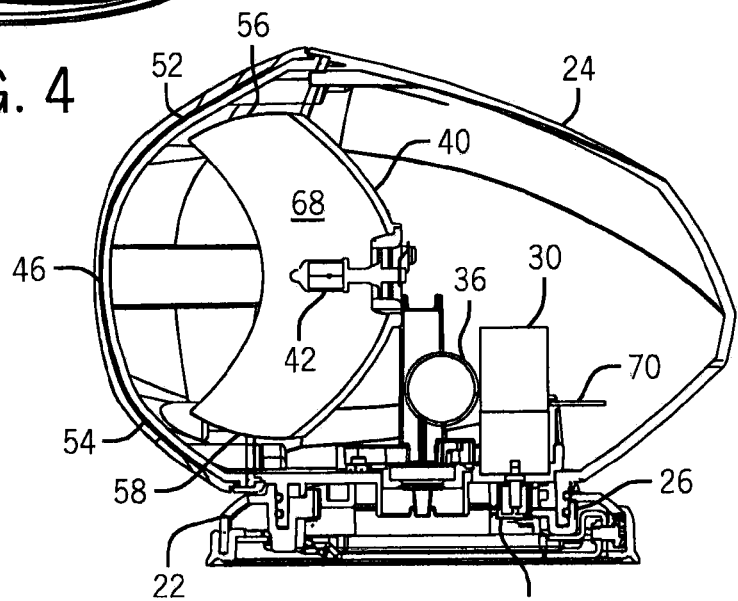
FIG. 5 is a side section view of the light of FIG. 1.
Figure 6:
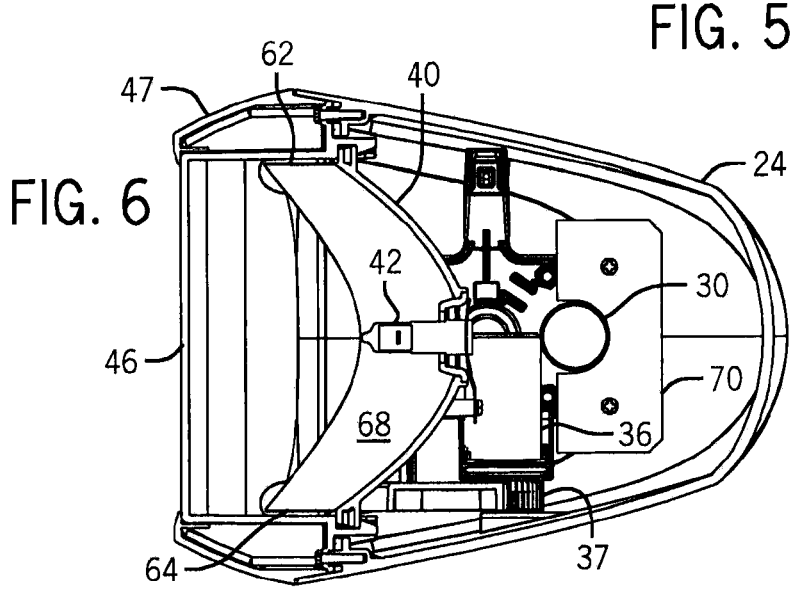
FIG. 6 is a top section view of the light of FIG. 1.
Figure 7:
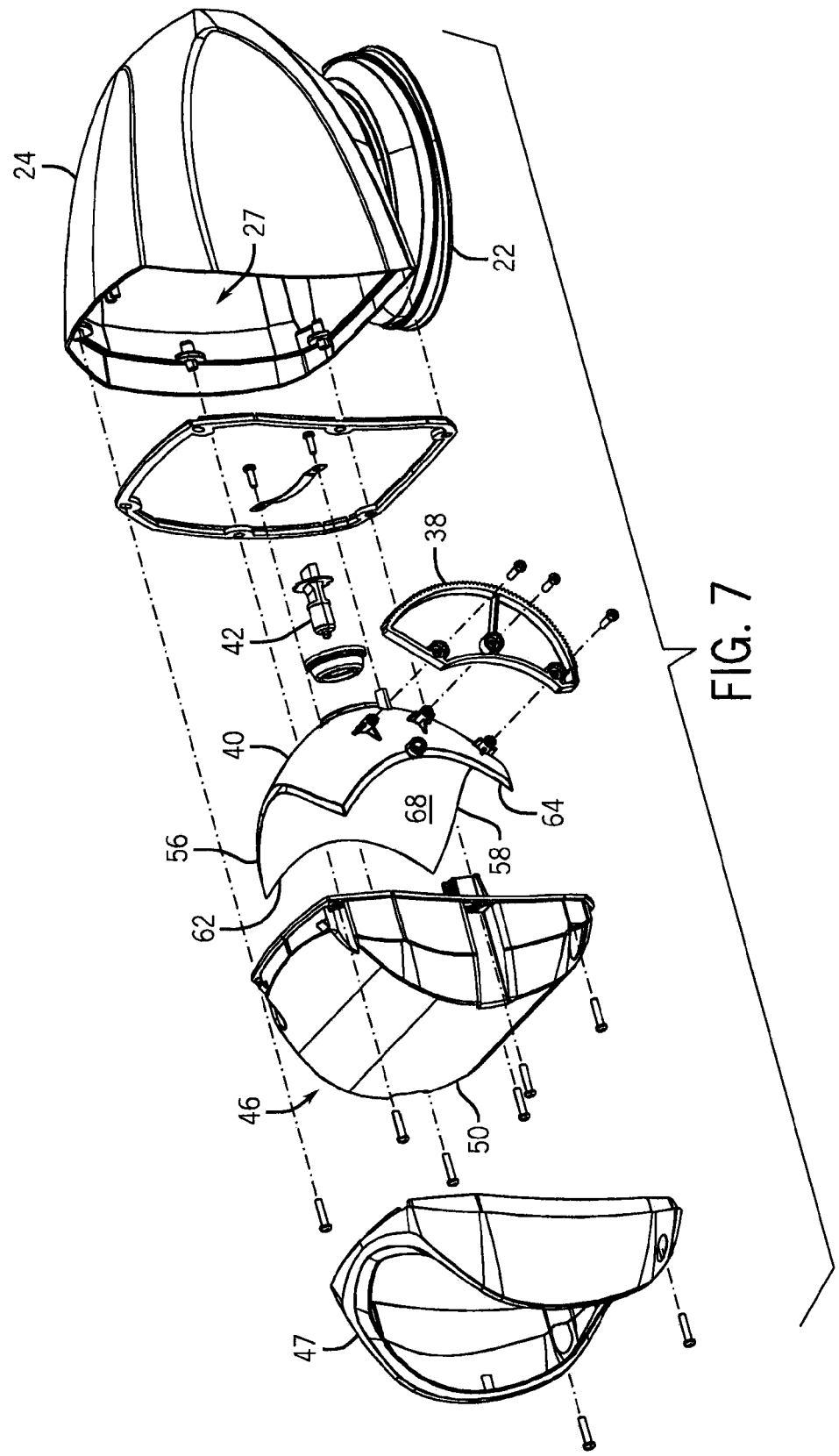
FIG. 7 is a partially exploded view of the light of FIG. 1.
Figure 8:
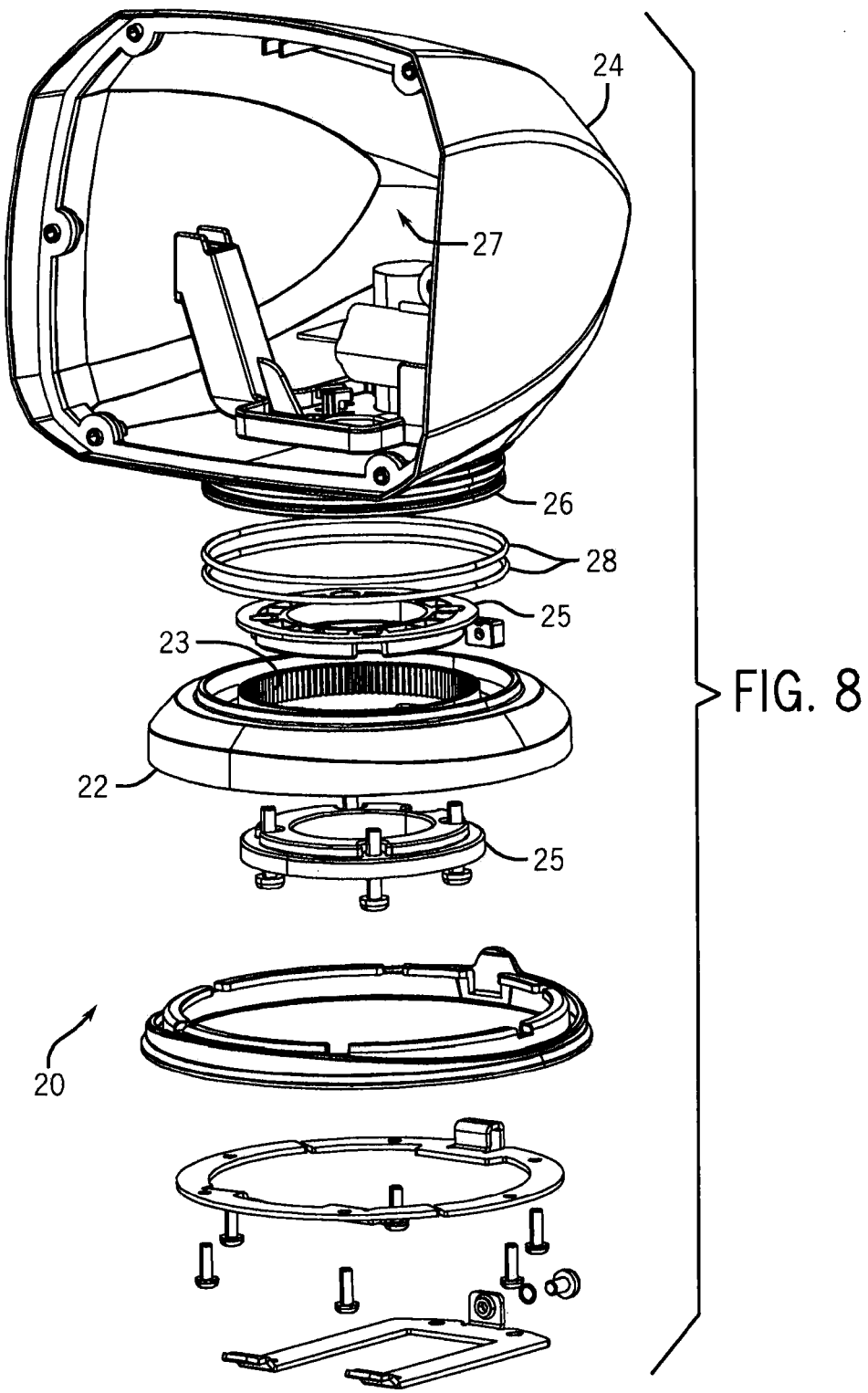
FIG. 8 is another partially exploded view of the light of FIG. 1.
Figure 9:
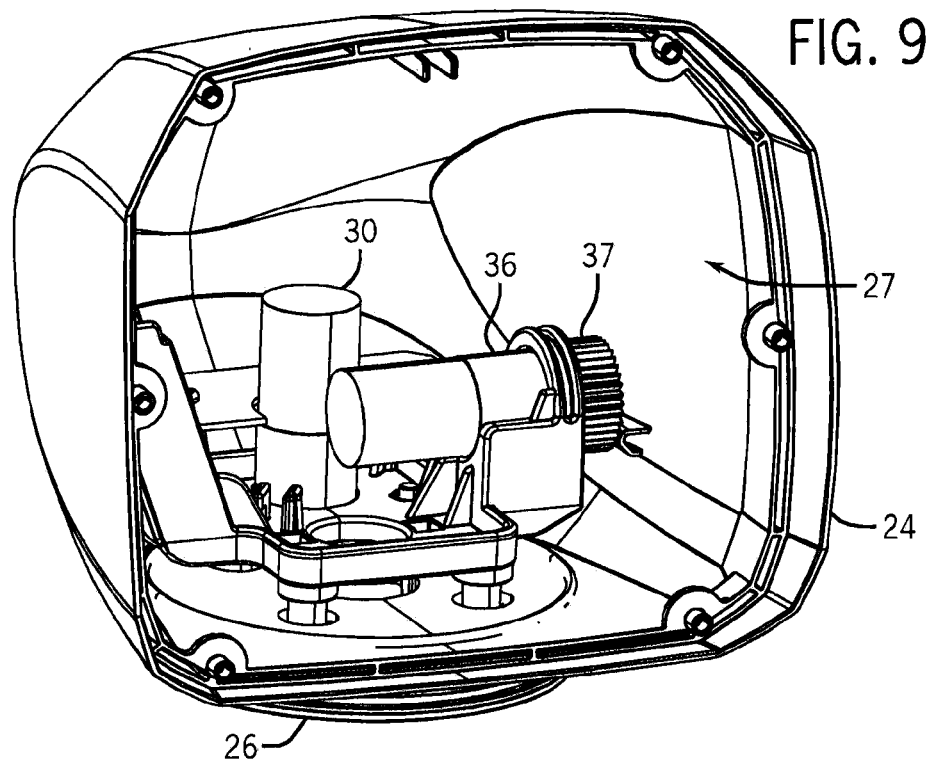
FIG. 9 is a perspective view of drive motors housed within the light housing.
Figure 10:
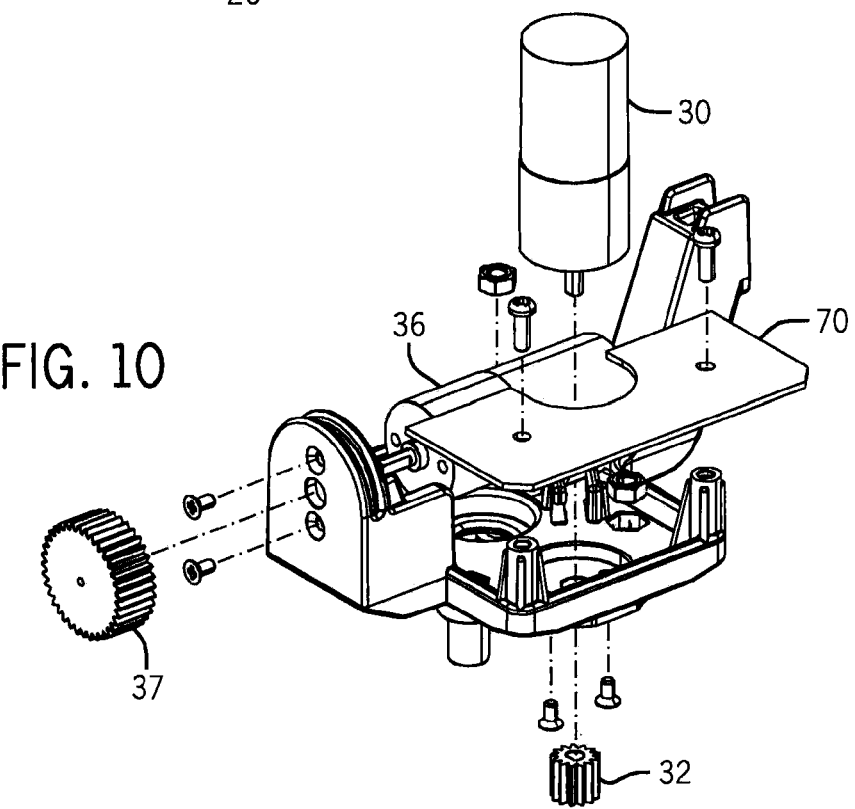
FIG. 10 is an exploded view of the drive motors and supports of FIG. 9.
Figure 11:
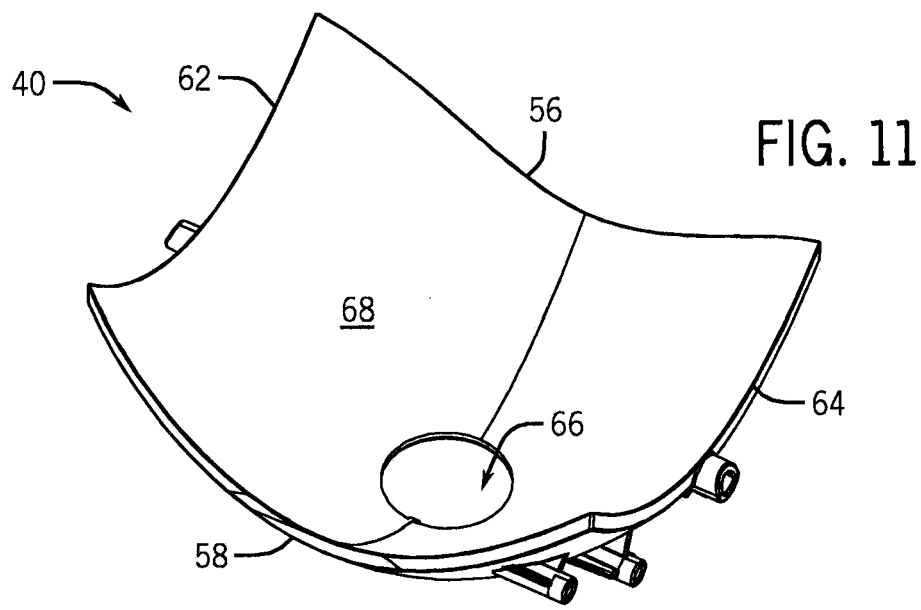
FIG. 11 is a perspective view of a reflector of the light of FIG. 1.
Figure 12:
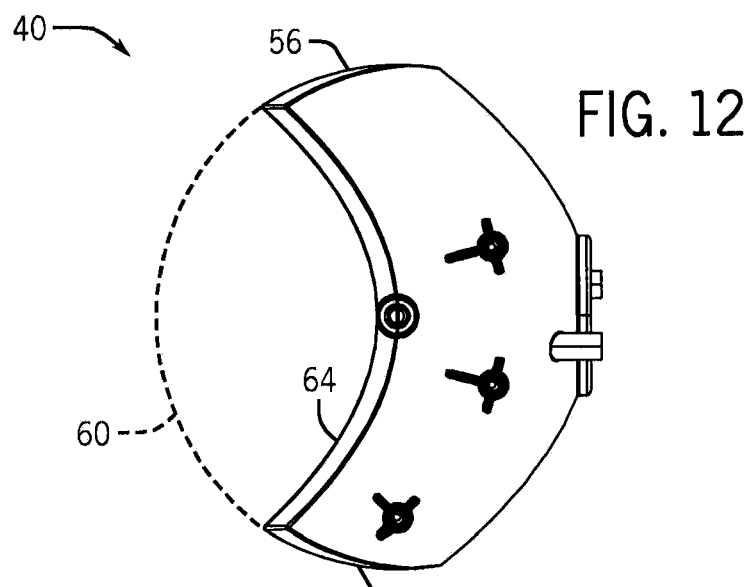
FIG. 12 is a side view of the reflector of FIG. 11.
Figure 13:
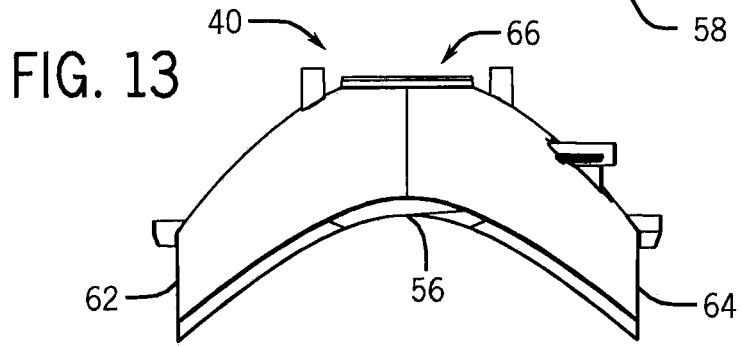
FIG. 13 is a top view of the reflector of FIG. 11.

Referring to FIG. 1, a spotlight 10 according to the present invention generally includes a light 12 that is controlled (i.e., turned on and off and pivoted) by a wireless remote control 14 and/or a bridge remote control 16. The light 12 is configured to be mounted on an external surface of a marine vessel (not shown), such as a yacht, tug boat, commercial fishing boat, or the like. The wireless remote control 14 controls the light 12 via a wireless signal; as such, the wireless remote control 14 may be positioned in various external or internal locations on the marine vessel. The bridge remote control 16 electrically connects to the light 12 via electrical wires 18 having sufficient lengths to permit the control 16 to be positioned within the marine vessel (e.g., on the bridge). In the following paragraphs, the above components are described in further detail, beginning with the light 12 and concluding with the bridge remote control 16.

Referring now to FIGS. 2-10, the light 12 generally includes multiple sections that are pivotable relative to one another to permit light to be directed toward an object of interest. One of these sections is a base 20 that may be fixedly secured to an external surface of the marine vessel (e.g., via fasteners). The base 20 includes a mounting pedestal 22 having an internal ring gear 23 (FIG. 8) that is used as described in further detail below. The mounting pedestal 22 also supports a bearing 25, and the bearing 25 supports a light housing 24 there above. As such, the mounting pedestal 22 and the bearing 25 permit the light housing 24 to pivot about a first vertical axis relative to the base 20.

The light housing 24 is a generally hollow component including a front opening 27 from which light is emitted as described in further detail below. Opposite the front opening 27, the light housing 24 includes a lower mounting ring 26 that is supported by the bearing 25. In order to inhibit water ingress between the light housing 24 and the pedestal 22, the lower mounting ring 26 supports two o-rings 28 (FIG. 8), preferably comprising an elastomeric material such as silicone.

The light housing 24 internally supports components that facilitate operation (e.g., turning on and off and pivoting) of the light 12. For example, the light housing 24 supports a first drive motor 30 that extends toward the lower mounting ring 26, and the first drive motor 30 supports an output gear 32 within the lower mounting ring 26. The output gear 32 drivingly engages the ring gear 23 defined by the pedestal 22; as such, the drive motor 30 may be energized to move the output gear 32 along the ring gear 23, thereby pivoting the light housing 24 relative to the base 20.

Still referring to FIGS. 2-10, the housing 24 also supports a second drive motor 36 adjacent to the first drive motor 30. The second drive motor 36 supports an output gear 37 that drivingly engages a segment gear 38 pivotally mounted relative to the housing 24. The segment gear 38 fixedly connects (e.g., via fasteners) to a light reflector 40 that is also pivotally supported relative to the housing 24 about the second axis. The light reflector 40 supports a light-emitting device 42 (e.g., a halogen light bulb, an incandescent light bulb, a light-emitting diode, or the like), and as such, the light-emitting device 42, the reflector 40, and the segment gear 38 pivot about the second axis relative to the housing 24 when the second drive motor 36 is energized. As such, the light-emitting device 42 and the reflector 40 may be pivoted horizontally and/or vertically to illuminate a particular object of interest.

Due to the rotation of the reflector 40 and the light-emitting device 42 within the housing 24, the light 12 includes one less external housing section that pivots relative to an adjacent housing section compared to previous spotlights. As such, the light 12 includes one less external gap and leak path through which water and moisture may enter the device.

Referring now to FIGS. 2-7 and 14-16, to protect and pivotally support the reflector 40 and the light-emitting device 42, the housing 24 supports a transparent (or nearly transparent) lens 46 that is secured over the front opening 27 by a perimeter cover 47. The lens 46 has a curved front panel 48 as viewed in a direction parallel to the second axis (i.e., as shown in FIG. 15) to facilitate the reflector's 40 movement within the housing 24 while transmitting a large amount of reflected light. In particular, the front panel 48 has a central portion 50 having a general longitudinally extending cylindrical shape to provide clearance, in part, from the pivotable reflector 40. Adjacent upper and lower portions 52, 54 of the front panel 48 have general longitudinally extending cylindrical shapes or may alternatively be planar. In either case, the upper and lower portions 52, 54 have larger radii than that of the central portion 50. Such a construction presents more of the lens 46 at nearly a right angle to light reflected by upper and lower portions of the reflector 40 when the reflector 40 is rotated upwardly or downwardly. It is preferred to transmit light through the lens 46 at an angle as close to a right angle as possible to increase transmission through the lens 46 and inhibit reflection due to the lens 46. Thus, the lens 46 facilitates emission of a high-quality beam from the spotlight 10.

Referring to FIGS. 5, 6, and 11-13, the edges of the reflector 40 are also shaped to provide clearance, in part, from the lens 46. In particular, the upper edge 56 and lower edge 58 of the reflector 40 are defined by an imaginary cylindrical surface 60 (FIG. 12) having a longitudinal axis aligned with the second axis. The radius of the imaginary cylindrical surface 60 is preferably identical to that of the central portion 50 of the lens 46. Similarly, the first and second side edges 62 and 64 of the reflector 40 are generally flat in a plane facing a direction parallel to the second axis (as most clearly shown in FIG. 6).

Besides the edges 56, 58, 62, and 64 and a mounting hole 66 in which the light-emitting device 42 is supported, a front reflection surface 68 of the reflector 40 preferably has a paraboloid shape. By using such a shape, light beams emitted by the light-emitting device 42 and reflected by the various areas of the reflection surface 68 are reflected parallel to one another and toward the lens 46.

Figure 33:
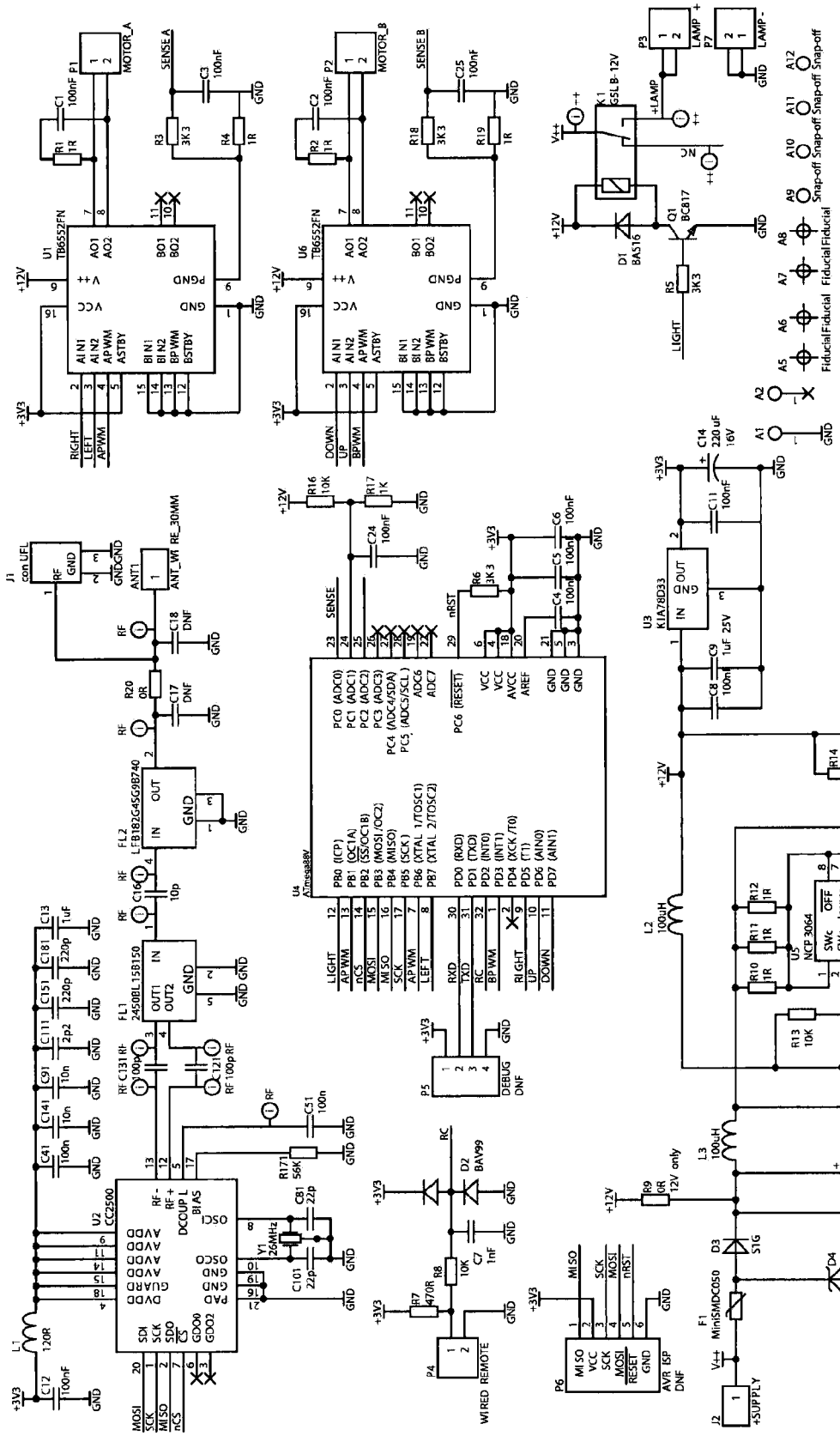
FIG. 33 is an electrical schematic of the spotlight.

Returning to FIGS. 2-10, the light housing 24 also houses a controller 70 (e.g., a printed circuit board). The controller 70 is schematically shown in FIG. 33. In general, the controller 70 selectively provides power to the light-emitting device 42 and the drive motors 30, 36 to provide illumination and pivot the light reflector 40 relative to the base 20, respectively. The controller 70 is capable of powering the drive motors 30, 36 simultaneously such that the spotlight 10 and the emitted beam of light move in a diagonal manner. The controller 70 also advantageously facilitates ease of aiming the beam emitted by the spotlight 10.

In addition, the controller 70 de-energizes the drive motors 30, 36 if a user attempts to pivot the housing 24 or the reflector 40 past the end of their range of motion (e.g., by holding a button on one of the controls 14, 16, as described in further detail below, after the reaching the end of the range of motion). The controller 70 performs this task by monitoring the current supplied to the drive motors 30, 36. If the supplied current suddenly increases over a certain threshold, this indicates the motor 30 or 36 has stalled by reaching the end of its range of motion. At this point, the controller 70 de-energizes the motor 30 or 36 to prevent it from burning out due to the high current.

Referring now to FIGS. 19-32, the wireless remote control 14 will now be described in further detail. The wireless remote control 14 is removably received in a cradle 72 that may be secured to an internal or external surface of the marine vessel. Alternatively, the wireless remote control 14 may be provided without a cradle 72. In any case, the wireless remote control 14 includes a housing 73 that supports a controller 74 (e.g., a printed circuit board). The controller 74 wirelessly sends control signals to the controller 70 when control inputs are pressed by a user.

Figure 20:
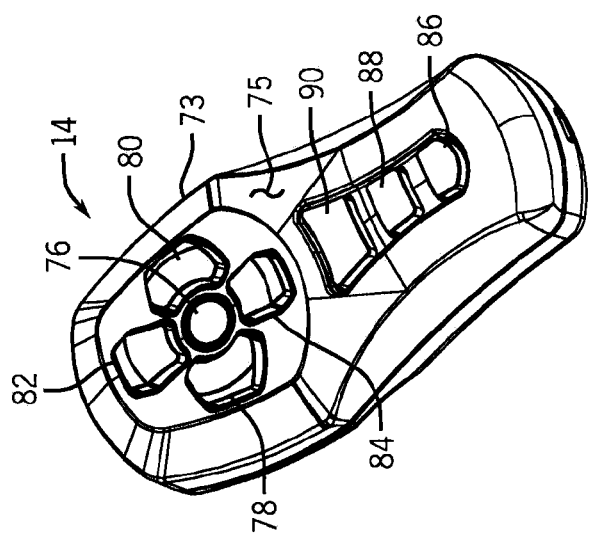
FIG. 20 is a front perspective view of the wireless remote control of FIG. 1 removed from the mounting cradle.
Figure 19:
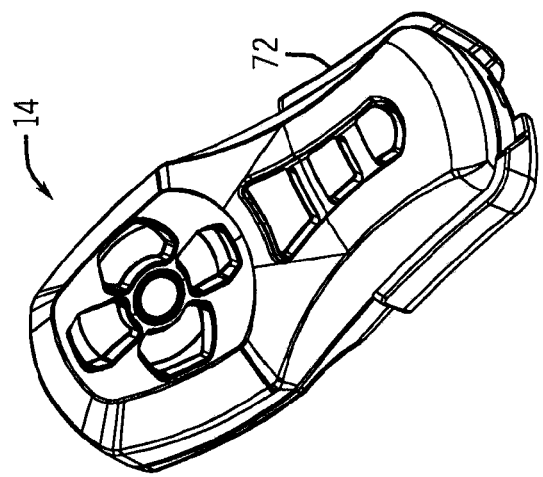
FIG. 19 is a front perspective view of the wireless remote control of FIG. 1 received in a mounting cradle.
Figure 22:
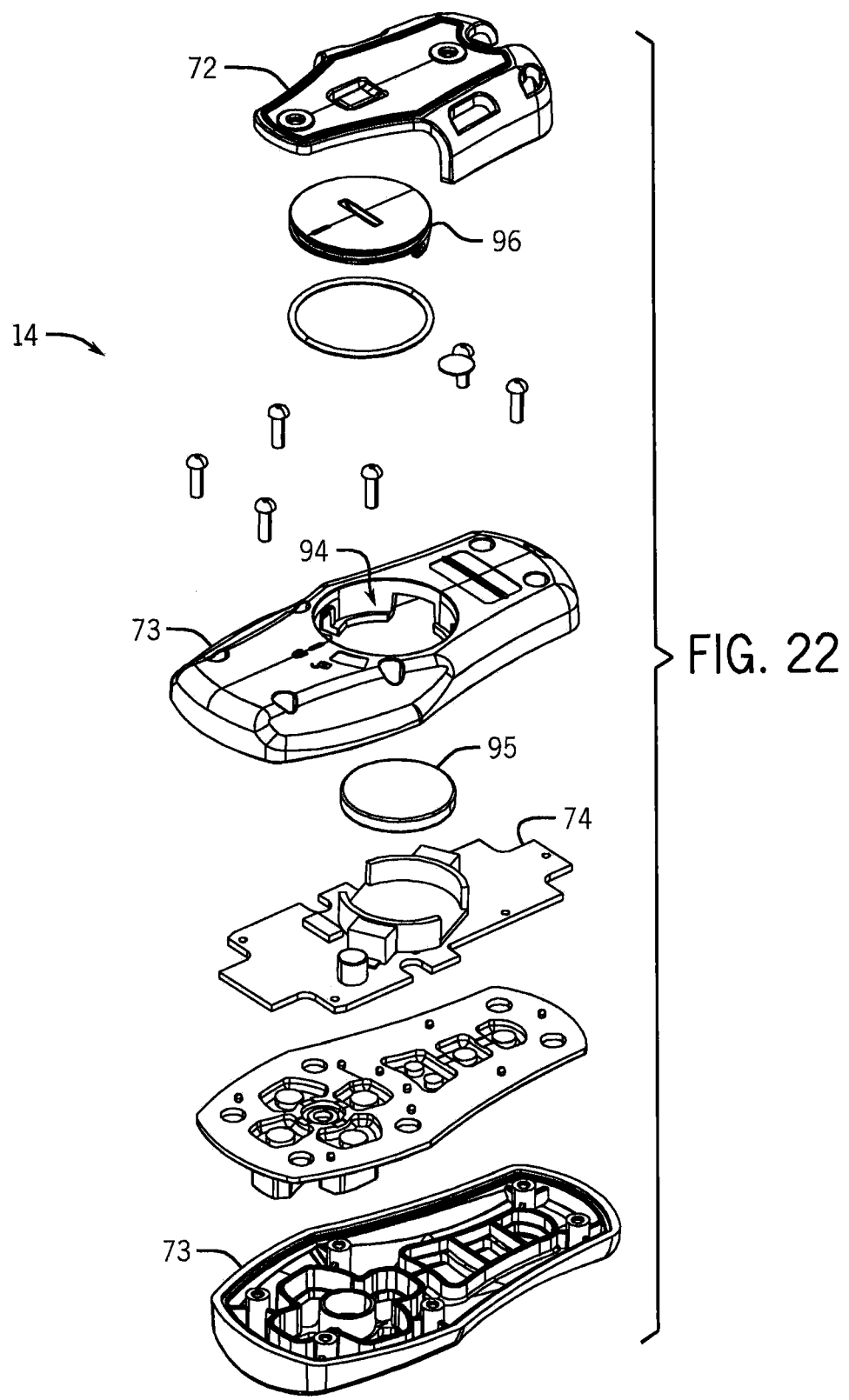
FIG. 22 is an exploded view of the wireless remote control of FIG. 1.
Figure 23:
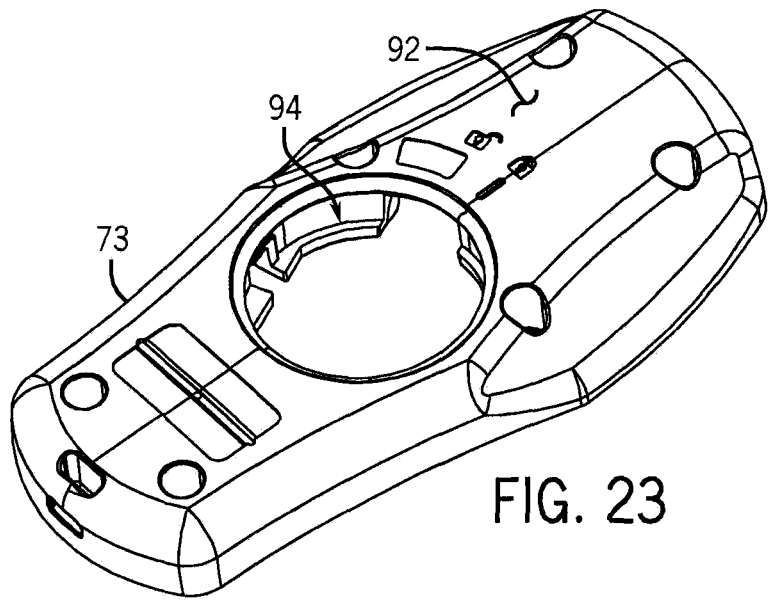
FIG. 23 is a rear perspective view of a housing of the wireless remote control of FIG. 19.
Figure 24:
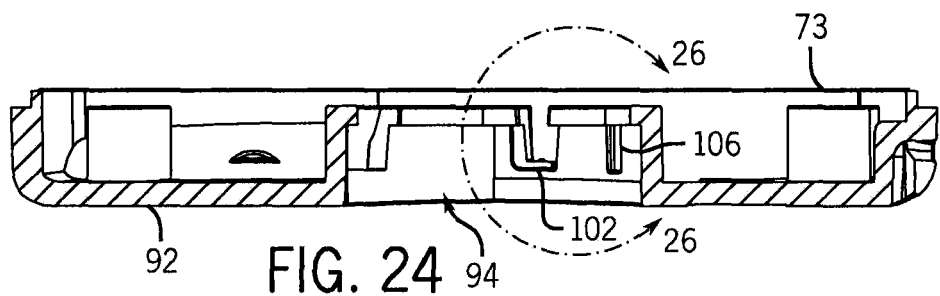
FIG. 24 is a side sectional view of the housing of FIG. 23.
Figure 25:
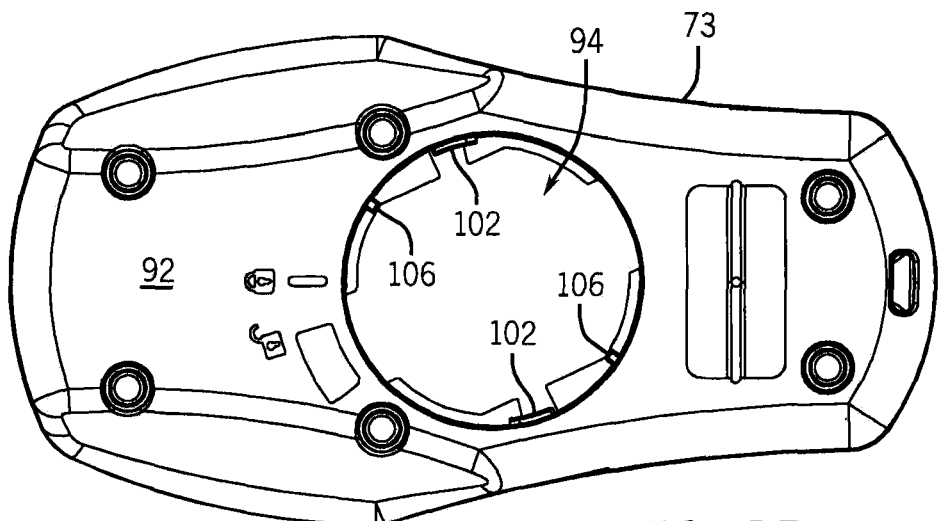
FIG. 25 is a rear view of the housing of FIG. 23.
Figure 26:
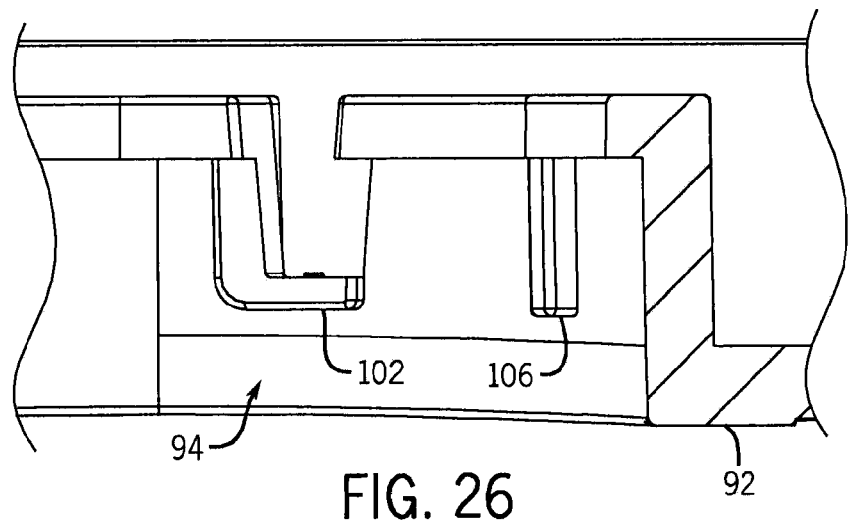
FIG. 26 is a detail view of a battery compartment of the wireless remote control enclosed by line 26-26 of FIG. 24.
Figure 27:
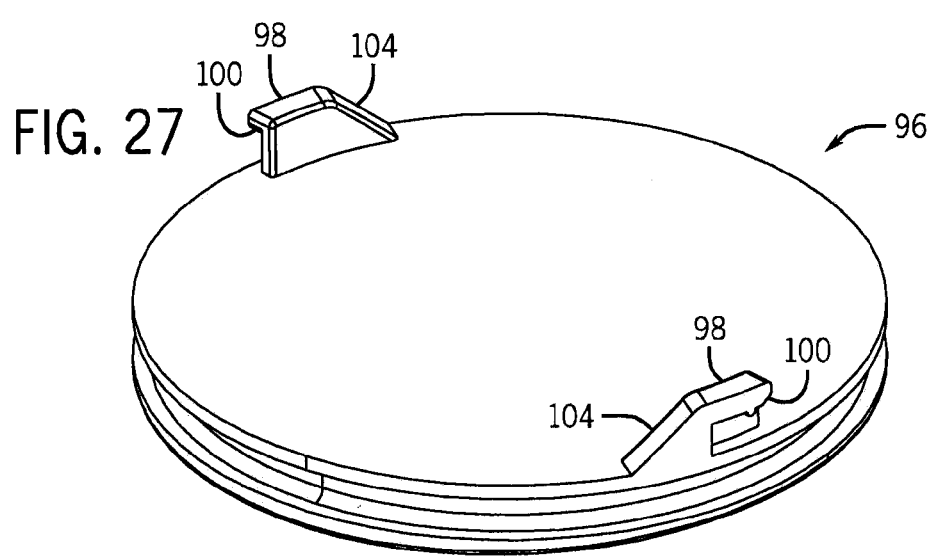
FIG. 27 is a perspective view of a battery door of the wireless remote control of FIG. 19.
Figure 28:
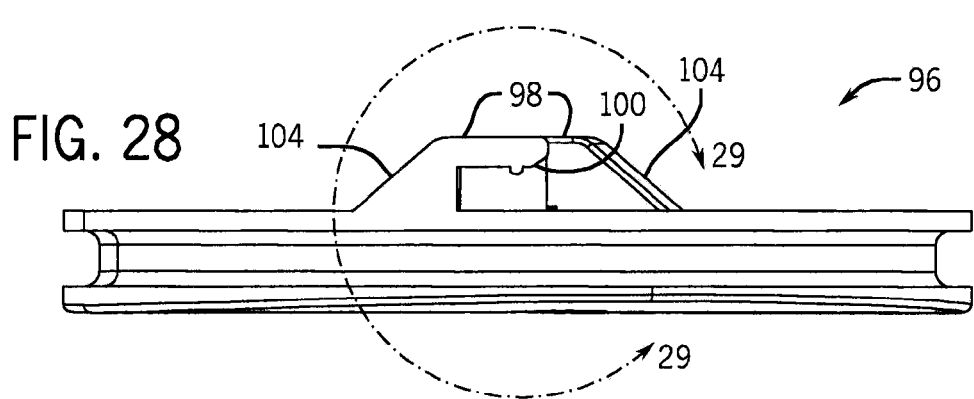
FIG. 28 is a side view of the battery door of FIG. 27.
Figure 29:
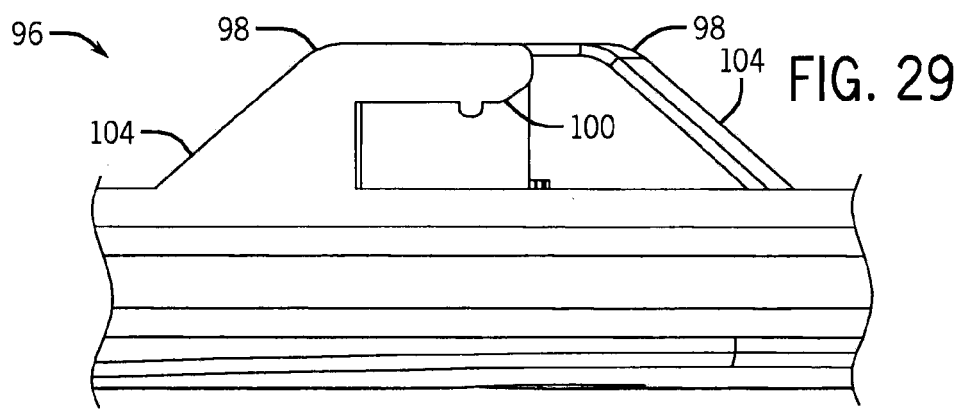
FIG. 29 is a detail view of locking ears of the battery door enclosed by line 29-29 of FIG. 28.
Figure 30:
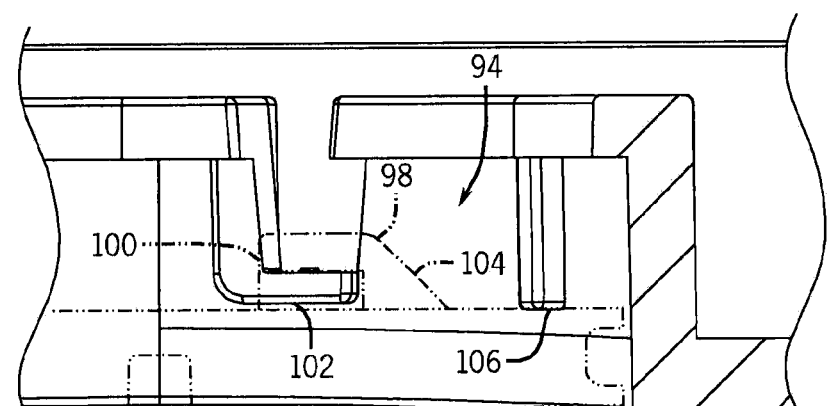
FIG. 30 is a detail view of the battery compartment and the battery door in a locked position.
Figure 31:
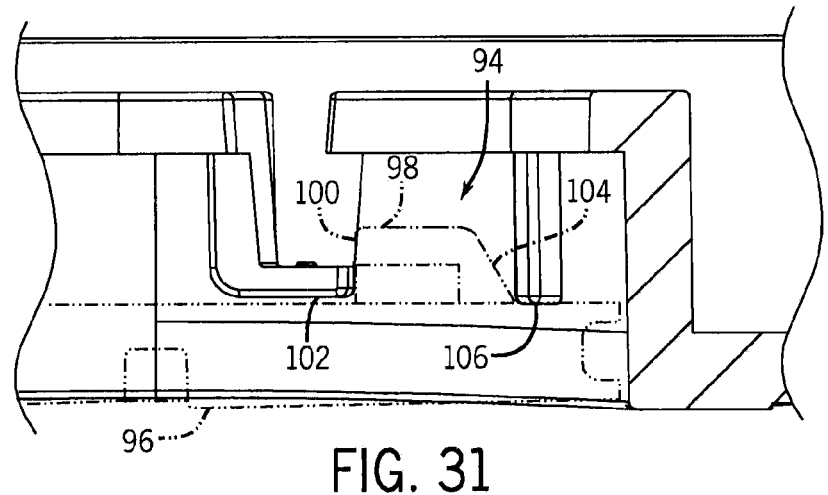
FIG. 31 is a detail view of the battery compartment and the battery door moving out of the battery compartment.
Figure 32:
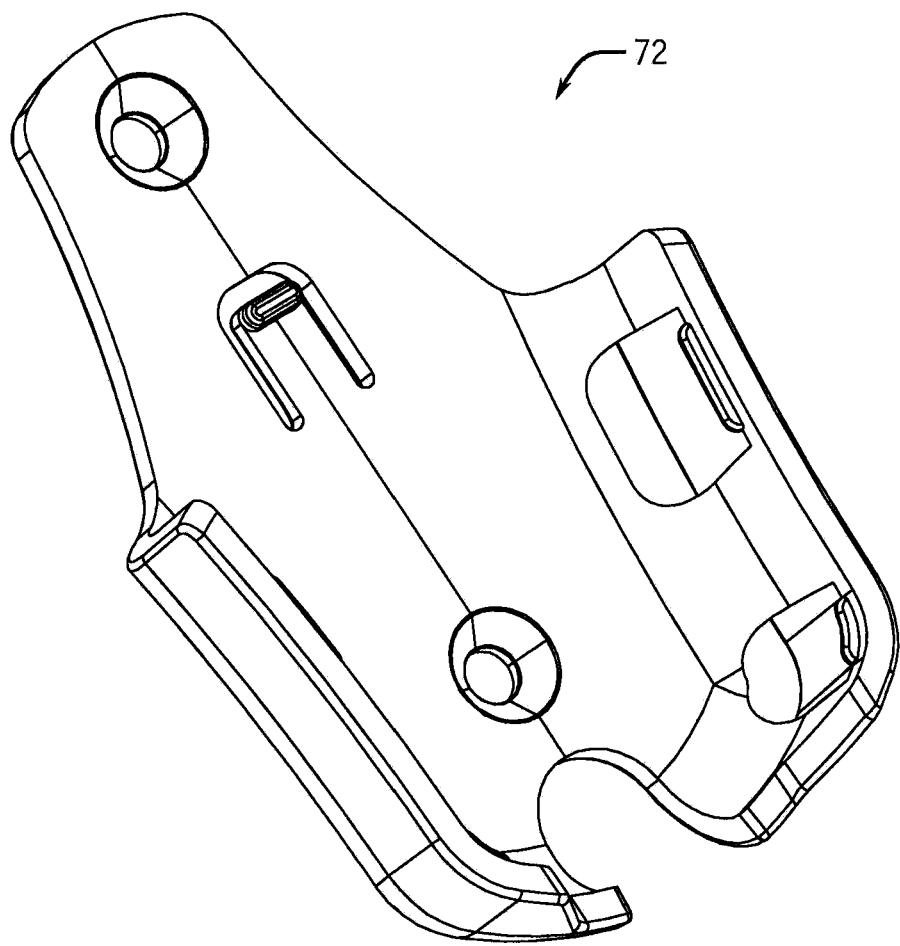
FIG. 32 is a perspective view of the wireless remote control cradle of FIG. 19.

As shown in FIG. 20, a front surface 75 of the wireless control housing 73 includes a plurality of such inputs (e.g., keys or buttons) for controlling the light 12. Specifically, the wireless control 14 includes an on/off button 76 for turning the light-emitting device 42 on and off. A pair of horizontal adjustment buttons 78, 80 are disposed on the sides of the on/off button 76 and are used to pivot the housing 24 in opposite directions about the first vertical axis. Similarly, a pair of vertical adjustment buttons 82, 84 are disposed above and below the on/off button 76, respectively, and are used to pivot the reflector 40 and the light-emitting device 42 in opposite directions about the second horizontal axis. The wireless control 14 may also include additional buttons that are used to perform advanced functions. For example, an SOS button 86 may be included that causes the light-emitting device to automatically blink using an SOS pattern. As another example, a sweep button 88 may be included that causes the light to automatically pivot back and forth about the first vertical axis. As yet another example, a speed adjustment button 90 may be included that changes the speed at which the light 12 automatically sweeps or pivots when pressing the other buttons 78, 80, 82, 84.

A rear surface 92 of the wireless remote control 14 defines a generally cylindrical compartment or recess 94 in which a battery 95 (FIG. 22) is stored. The recess 94 also detachably receives a generally disk-shaped battery door 96 that encloses the battery 95 within the recess 94.

Referring specifically to FIGS. 26-31, the battery door 96 and the surfaces defining the recess 94 include features that facilitate easy detachment of the battery door 96 (e.g., to permit replacement of an exhausted battery). In particular, the battery door 96 includes a pair of locking ears 98 that are diametrically opposed to one another. Each ear 98 includes a lobe 100 that is engageable with a locking projection 102 defined by the housing 73 within the battery recess 94. As such, the battery door 96 may be pivoted in a first direction to position the lobe 100 under the locking projection 102 and thereby fix the battery door 96 relative to the housing 73. Opposite the lobe 100, each ear 98 includes an angled surface 104 that is engageable with a detachment projection 106 defined by the housing 73 within the battery recess 94. Accordingly, the battery door 96 may be pivoted in a second direction to engage the angled surface 104 against the detachment projection 106. This action causes the angled surface 104 and the battery door 96 to ride up the detachment projection 106 and move out of the battery recess 94.

Moreover, the locking projection 102 and the detachment projection 106 are only offset by a short distance within the recess 94. As such, the battery door 96 may be pivoted a small amount (e.g., about an eighth of a turn) to unlock and be pushed away from the battery recess 94.

Figure 18:
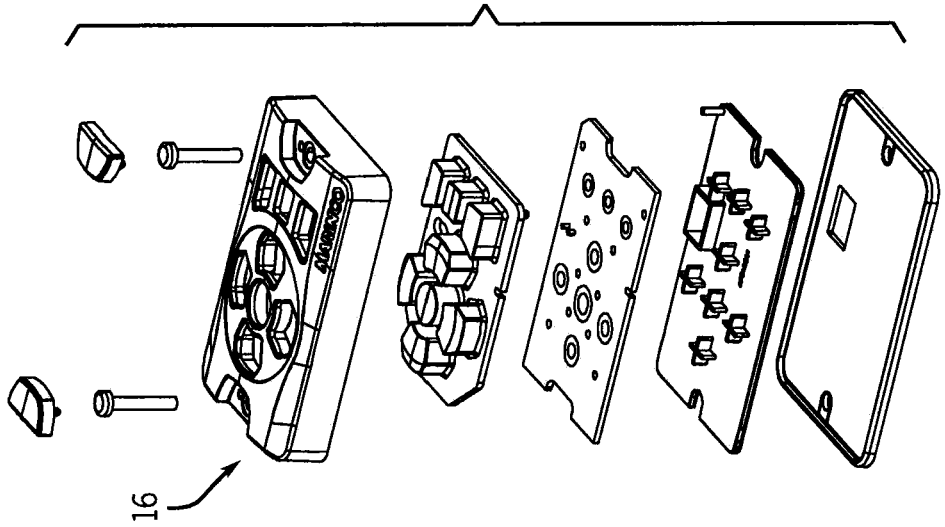
FIG. 18 is an exploded view of the bridge remote control of FIG. 17.
Figure 17:
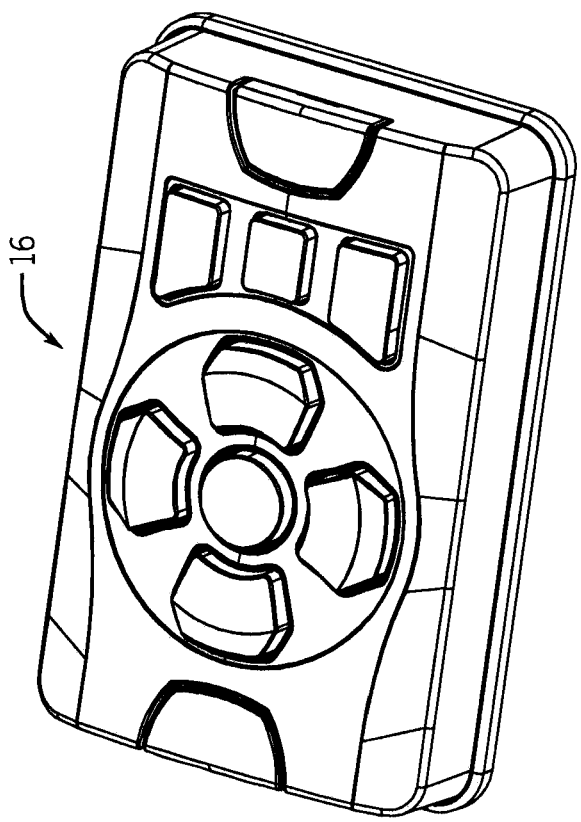
FIG. 17 is a perspective view of the bridge remote control of FIG. 1.
Figure 21:
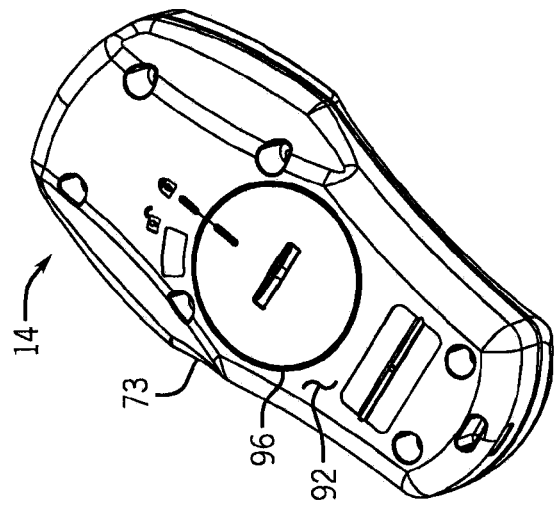
FIG. 21 is a rear perspective view of the wireless remote control of FIG. 1 removed from the mounting cradle.

Referring now to FIGS. 17-18, the bridge remote control 16 operatively communicates with the controller 70 via electrical wires 18. Alternatively, the bridge remote control 16 may communicate with the controller 70 via a wireless signal and may receive power via the electrical wires 18. In any case, the bridge remote control 16 includes the same inputs as the wireless remote control 14 and is thereby capable of controlling the light 12 in the same manner as the wireless remote control 14. For these reasons, the bridge remote control 16 will not be described in further detail.

From the above description, it should be apparent that the present invention addresses the drawbacks of previous marine spotlights. In particular, the internally pivoting reflector and light-emitting device eliminate one leak path through which water and/or moisture may enter the spotlight. This reduces the possibility of water damaging components within the spotlight. Furthermore, the controller de-energizes the drive motors at the ends of their range of motion to prevent them from stalling and burning out. Further still, the battery door is configured to move itself away from the battery recess as a user pivots the door. As such, a user need not attempt to pry between the battery door and the remote control housing to remove the battery door.

A preferred embodiment of the invention has been described in considerable detail. Many modifications and variations to the preferred embodiment described will be apparent to a person of ordinary skill in the art. Therefore, the invention should not be limited to the embodiment described, but should be defined by the claims that follow.

We claim:

1. A spotlight for a vehicle, comprising: a base configured to be supported by a surface of the vehicle; a housing mounted to the base so as to pivot about a first axis relative to the base; a light-emitting device supported within the housing; a reflector configured to reflect light emitted by the light-emitting device, the reflector being mounted within the housing so as to pivot about a second axis relative to the housing, and the second axis being generally perpendicular to the first axis; and a lens connected to the housing such that the reflector is pivotable about the second axis relative to the lens, the lens being configured such that light emitted by the light-emitting device and reflected by the reflector passes through the lens, and the lens including a central portion having a generally cylindrical shape that extends longitudinally in a direction generally parallel to the second axis.

2. The spotlight of claim 1, wherein the light-emitting device is supported by the reflector so as to pivot about the second axis relative to the housing together with the reflector.

3. The spotlight of claim 1, wherein the central portion of the lens has a first radius, the lens includes a lower portion having a generally cylindrical shape that extends longitudinally in a direction generally parallel to the second axis, the lower portion has a second radius, and the second radius is greater than the first radius.

4. The spotlight of claim 3, wherein the lens includes an upper portion having a generally cylindrical shape that extends longitudinally in a direction generally parallel to the second axis, the upper portion has a third radius, and the third radius is greater than the first radius.

5. The spotlight of claim 1, wherein the central portion of the lens has a first radius, the reflector has a top edge and a bottom edge separated in a direction perpendicular to the second axis, the top edge and the bottom edge being defined by an imaginary cylindrical surface having a longitudinal axis aligned with the second axis, the imaginary cylindrical surface having a second radius, and the first radius and the second radius are approximately equal.

6. The spotlight of claim 1, further comprising: a segment gear supported by the reflector; and a drive motor supported within the housing and including an output gear in driving engagement with the segment gear, the drive motor being operable to rotate the output gear and thereby pivot the segment gear and the reflector about the second axis.

7. The spotlight of claim 6, wherein the drive motor is supported within the housing so as to be rotatable about the first axis and further comprising a second motor supported within the housing so as to drive the housing about the first axis and rotate with the housing about the first axis.

8. The spotlight of claim 1, wherein the reflector has a reflecting surface configured to reflect light emitted by the light-emitting device, and the reflecting surface has a paraboloid shape.

9. The spotlight of claim 8, wherein the reflector has a top edge and a bottom edge separated in a direction perpendicular to the second axis, and the top edge and the bottom edge are defined by an imaginary cylindrical surface having a longitudinal axis aligned with the second axis.

10. The spotlight of claim 9, wherein the reflector has a first side edge and a second side edge separated in a direction parallel to the second axis, and the first and second side edges are generally flat in a plane facing a direction parallel to the second axis.

11. The spotlight of claim 1, wherein the housing connects to the base so as to pivot about the first axis relative to the base and between a first end and a second end of a first range of motion, and further comprising: a first drive motor operable to pivot the housing and the reflector about the first axis relative to the base; a remote control having a first input being actuatable to send a first signal; a controller configured to energize the first drive motor to pivot the housing and the reflector about the first axis relative to the base upon receiving the first signal from the remote control and if the housing and the reflector are pivotally between the first end and the second end of the first range of motion, and the controller being configured to de-energize the first drive motor upon receiving the first signal from the remote control and if the housing and the reflector are at one of the first end and the second end of the first range of motion.

12. The spotlight of claim 11, wherein the controller is configured to sense an electric current provided to the first drive motor to determine if the housing and the reflector are at one of the first end and the second end of the first range of motion.

13. The spotlight of claim 12, wherein the reflector is mounted within the housing so as to pivot about the second axis relative to the housing and between a first end and a second end of a second range of motion, and further comprising a second drive motor operable to pivot the reflector about the second axis relative to the housing, wherein the remote control has a second input being actuatable to send a second signal, and the controller is configured to energize the second drive motor to pivot the reflector about the second axis relative to the housing upon receiving the second signal from the remote control and if the reflector is pivotally between the first end and the second end of the second range of motion, and the controller being configured to de-energize the second drive motor upon receiving the second signal from the remote control and if the reflector is at one of the first end and the second end of the second range of motion.

14. The spotlight of claim 13, wherein the controller is configured to sense a first electric current provided to the first drive motor to determine if the reflector is at one of the first end and the second end of the first range of motion, and the controller is configured to sense a second electric current provided to the second drive motor to determine if the reflector is at one of the first end and the second end of the second range of motion.

* * * * *